CONTROL DEVICE FOR GAS TURBINE ENGINES

Filed July 5, 1967 2 Sheets-Sheet 1

INVENTORS
Christian Greune
Hilbert Holzhauer
Siegfried Steuer
Friedhelm Zimmer
BY
Bailey, Stephens and Huettig
ATTORNEYS

CONTROL DEVICE FOR GAS TURBINE ENGINES

Filed July 5, 1967 2 Sheets-Sheet 2

INVENTORS
Christian Greune
Hilbert Holzhauer
Siegfried Steuer
Friedhelm Zimmer
BY
Bailey, Stephens and Huettig
ATTORNEYS 3,498,058

CONTROL DEVICE FOR GAS TURBINE ENGINES

Christian Greune, 8 Bahnhofstr. 8081 Schongeising, Germany; Hilbert Holzhauer, 127/129 IV, Leopoldstr., 8000 Munich 23, Germany; Siegfried Steuer, 54 Pelkovenstr., 8000 Munich 54, Germany; and Friedhelm Zimmer, 7779 Kluftern 142, Germany Filed July 5, 1967, Ser. No. 651,286
Claims priority, application Germany, July 21, 1966, M 70,303
Int. Cl. F02c *9/04;* F02g *3/00*
U.S. Cl. 60—39.28 3 Claims

ABSTRACT OF THE DISCLOSURE

The operating values of an engine such as the r.p.m., temperature, compression pressure, etc., are logarithmically mechanically represented in a valve to control the fuel fed to the engine.

The invention applies to a control device for gas turbine engines and comprises a fuel pump, a pressure regulating valve, a metering orifice, and computing elements.

Such fuel control devices for gas turbine engines are intended to keep the engine within its maximum permissible operating limit, which is to be achieved, if possible, by means of a single operating lever on the control unit only. The control unit shall respond to as many ambient conditions as possible and meter the fuel flow accordingly. By supplying these maximum quantities, while adapting them to the ambient conditions to the highest possible degree, optimum utilization of the respective machine becomes possible.

Known control devices have sacrificed these optimum control properties for the sake of simplicity of the equipment, especially in the case of small engines.

The operating limit of an engine may be subdivided into several values, i.e. the temperature limit with respect to turbine blading, the surge limit with respect to stable working conditions of the compressor section, the speed limit, as defined by the rotor strength, and the flame-out limit of the combustion chamber which is characterized by lack of fuel or excess fuel in relation to the stoichiometric fuel/air mixture. Each of these limits can actually be registered individually either directly or indirectly and can thus be used for regulation or control purposes. As far as the control mechanism is concerned, however, the effort of registering and processing the respective values has been too great and therefore this has not been done in the past.

Thus, as in the case of small engines, a governor only had been provided as "the control unit," and all other limits had been taken care of by means of stops in this governor or with the aid of the characteristics of its components, e.g., its fuel pump with its linear fuel delivery versus r.p.m. An improvement of this version is achieved by the known installation of a temperature control loop or over-temperature protection system which, however, will not permit optimum control efficiency either. Improved versions of control units contain computers equipped with servos. These solutions which involve the use of computers, however, are rather sophisticated and thus expensive.

The above compilation of control devices, representing the present stage of the art, was prepared to show that, with the aid of special fuel metering methods according to this invention, not only would it be possible to obtain simple control devices but also to design very practical and accurate control units for small engines.

Thus the object of this invention is to produce an unsophisticated control device for optimum fuel metering, featuring as few components as possible and being particularly suitable for small engines.

According to this invention, this problem is solved by taking the logarithms of pressure and temperature signals and transmitting them to a valve spool covering a variable metering orifice and with an exponential stroke/flow characteristic, whereby the metering orifice is moved relative to the valve spool, its movement being a function of r.p.m. variation. The differential pressure at the metering orifice is kept constant in a known manner by means of a pressure regulating valve. The required fuel is supplied in sufficient quantity by the fuel pump.

According to this invention, shape and arrangement of the control elements form individual computing elements, which are able to multiply and to divide, as in a slide rule. The selection of logarithmic characteristics of the measuring elements permits multiplication and division by other magnitudes by simply adding or subtracting linear distances. This is the main feature of a simple-non-expensive control unit which will permit optimum fuel metering.

A further essential feature of the invention is a variable leverage ratio between the valve spool and the logarithms of the measuring values, preferably in the form of a reduction gearing. This arrangement enables the application of the same control device for engines of different performance ranges by adjusting the leverage ratio to the performance range of the respective engine.

The means by which the objects of this invention are obtained are described more fully with reference to the accompanying drawings in which.

Figure 1:
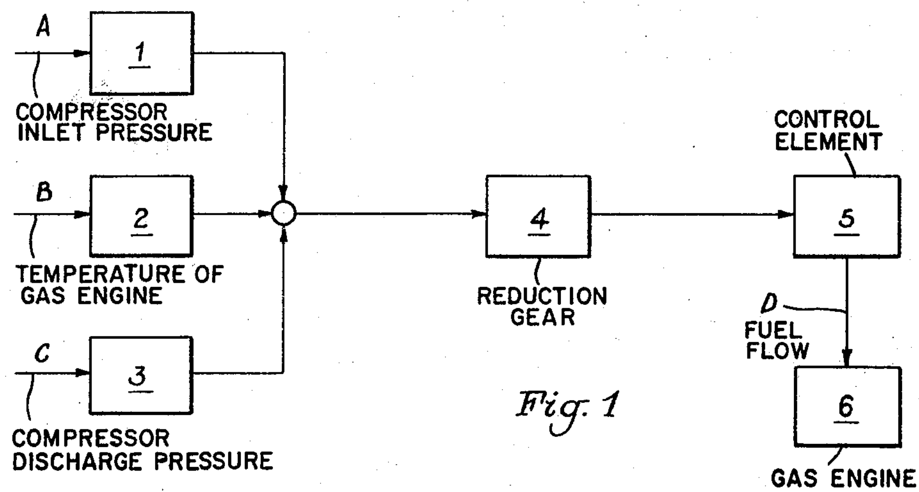
FIG. 1 is a schematic view of an arrangement according to this invention in which a value D is varied as a function of three input values A, B and C.

As shown in FIG. 1, the measured input values A, B and C are registered and their logarithms taken in the measuring elements 1, 2 and 3. The input values represent A=input pressure of the control device
B=the temperature as registered by the control device
C=an additional pressure such as the compressor discharge pressure.

The logarithms of the input signals are fed into a reduction gear 4 and into the exponential control element 5, from which the antilogarithm was taken, and which represents the output value D as a variable quantity which is a function of A, B and C. D represents the fuel metered to the engine.

If the reduction gear has a certain reduction ratio or if, as the case may be, no reduction gear is used at all, then the coordination of measured values A, B and C to the metered fuel quantity will be linearly proportional according to the relation $$D \sim A^{\pm 1} \cdot B^{\pm 1} \cdot C^{\pm 1}$$

Figure 2:
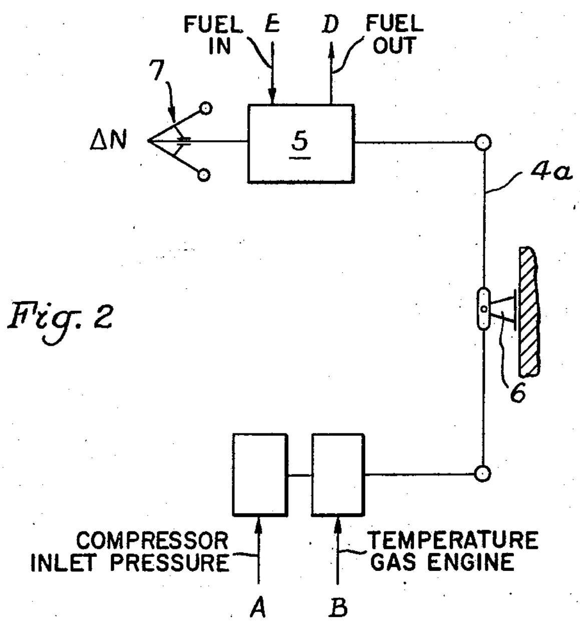
FIG. 2 is another schematic view of a further embodiment of the invention.

In this case, the control device must be designed to meet the requirements of a given engine and can only be used for engines of the same model. If it is planned, however, to use the same set-up for different engine models, a variable reduction ratio of reduction gear 4 will be required. This feature has been shown in FIG. 2 by presenting the reduction gear 4 in the form of lever 4*a* supported to pivot freely in fulcrum 6, whereby the latter is adjustable along the length of the lever to obtain the desired reduction ratio and thus to meet the requirements of the respective engine. Basically, the above relation formula will also apply for this arrangement, except for an exponent K deviating from unity, thus $$D \sim A^{\pm K} \cdot B^{\pm K} \cdot C^{\pm K}$$

which means a deviation from the linear coordination and, in a diagram, a bending or stretching, respectively, of the curves representing the acceleration and deceleration quantities versus r.p.m. can be obtained. The selection of an exponential characteristic for the cross-section of the metering orifice does not only ensure the raising of quantities to higher powers but also ensures a constant error percentage in fuel metering, irrespective of flow. Thus, the error can be eliminated by a suitable design. Another advantage of an exponential characteristic of the metering orifice cross-section is the fact that a constant ratio of fuel flow is associated with any r.p.m. variation. Thereby, also the fuel flow/r.p.m. variation ratio becomes a function of the input signals which, in turn, has a favorable effect on the stability of the control loop.

Thus, the design problem of determining the maximum and minimum fuel quantities can be solved in a very simple manner, as by means of adjustable stops on the governor or on the cylinder of the control unit. Also, in the arrangement according to FIG. 2, an r.p.m. deviation signal $\Delta N$ is offered to control element 5 with the aid of tachometer 7. At E fuel is supplied to the positioning element, while at D the metered fuel is discharged again. A and B are temperature and pressure input values.

Figure 3:
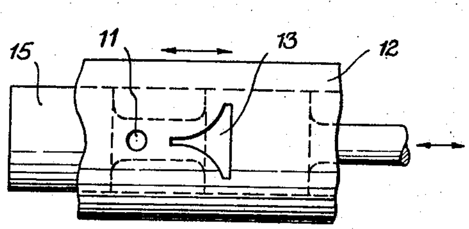
FIG. 3 is a view of a detail of the design of an arrangement according to the invention.
Figure 4:
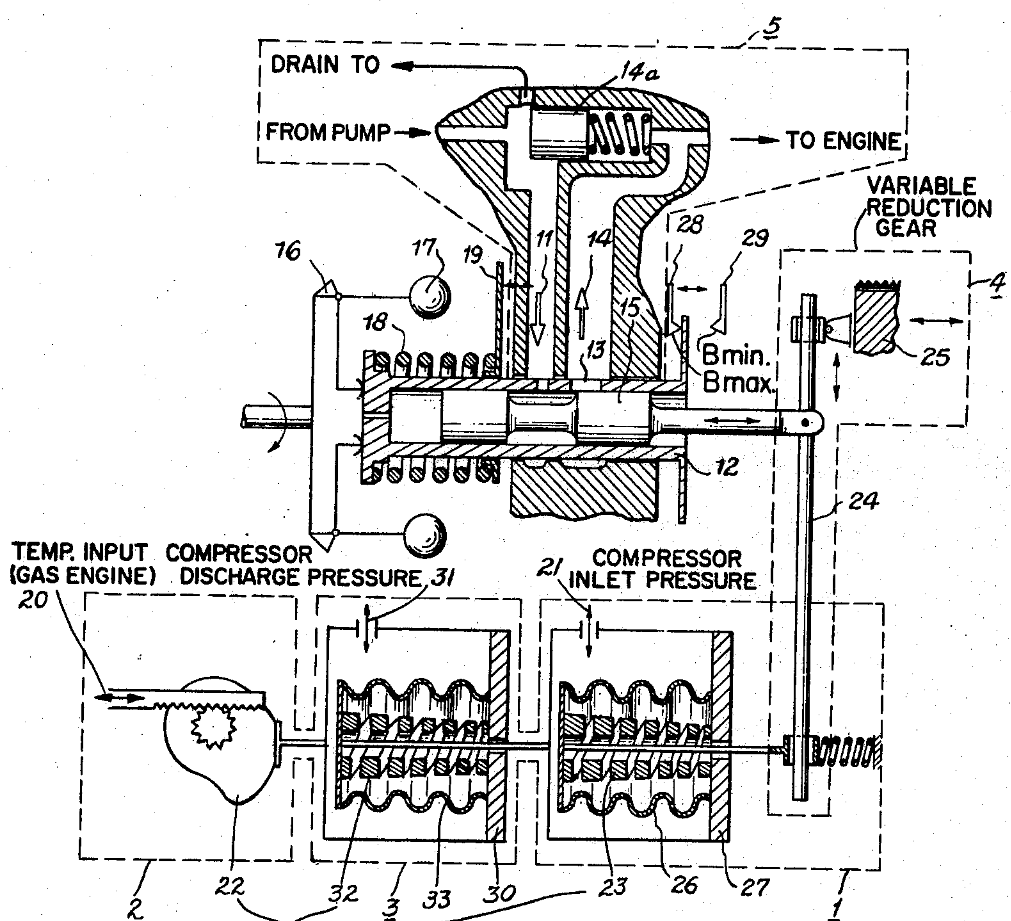
FIG. 4 is a cross-sectional view of the control device including the detail of FIG. 3.

As shown in FIGS. 3 and 4, a more detailed description of the function is given as follows. Through opening 11 the fuel, supplied under pressure from a fuel pump, enters the control cylinder 12 and through a metering orifice 13 is routed through pipe 14 to the combustion chamber. The edges of orifice 13 are V-shaped according to this invention. The pressure differential between opening 11 and pipe 14 is kept constant in a known manner with the aid of a differential pressure valve 14*a*. Thus, it will be possible to vary the metering orifice area and hence the fuel flow through it by movement of the controlling edge of the valve spool 15. A centrifugal governor 16 and the control cydlinder 12 are driven in proportion to the engine r.p.m. The weights 17 supported on governor 16 counteract the force of a spring 18, which may be adjusted by selection lever 19, and act on control cylinder 12 which is free to move in an axial direction.

In an r.p.m. control cycle, governor 16 moves the control cylinder 12 across the control edge of the valve spool 15 so as to expose a larger or smaller area of the metering orifice 13. As for the directions for values $B_{max}$ and $B_{min}$, respectively, the travel of control cylinder 12 is limited by the fixed and variable stops 28 and 29, respectively. By adjusting transmission elements 24 and 25, the logarithmic output signal of cam 22, in addition to that of bellows 26 and bellows base 27 acting on linkage 24, is assigned to the exponential characteristic of the metering orifice, and thus a precise tuning to the engine characteristics is achieved. The logarithmic travel signal acting on element 24 represents, with the aid of push rod 20 and cam 22, on the one hand, and the logarithmic spring 23 inside the bellows 26 on the other hand (quoted as an example), the logarithmic sum of compressor pressure input value 21 plus temperature input 20. Thus, the logarithmic sum acts on element 24 which determines the position of the control edge of the valve spool 15.

The compressor discharge pressure 31 is included by means of a logarithmic spring 32 in a bellows 33 actuated by the temperature input 20, and inserted in advance of the compressor pressure input value 21. This sends forward to linkage 24 a logarithmic signal corresponding to the compressor discharge pressure.

Through governor 16, the r.p.m. spring 18, in connection with the position of the selection lever 19, the r.p.m. acts linearly on control cylinder 12 and its control slot 13.

Having now described the means by which the objects of the invention are obtained,

We claim:

1. A fuel control device for a gas turbine engine comprising a fuel pump, a fuel control cylinder joined to said pump for receiving fuel, a fuel metering outlet orifice in said cylinder and having an exponential flow/stroke characteristic shape, a valve spool movably mounted in said cylinder to vary the size of said orifice, a pressure regulating valve for maintaining a constant pressure differential across said metering orifice, engine speed measuring means for moving said cylinder in its axial direction between maximum and minimum stops, and means for moving said valve spool in said cylinder as a function of the logarithm of engine temperature and compressor inlet pressure.

2. A device as in claim 1, further comprising incorporating an additional engine compressor discharge pressure signal into said device.

3. A device as in claim 2, further comprising a variable ratio reduction gear (4) interconnecting said valve spool and said means for moving said valve spool.

References Cited

UNITED STATES PATENTS 2,949,957 8/1960 Eastman -------- 60—32.28 X

FOREIGN PATENTS 574,745 4/1959 Canada.

CARLTON R. CROYLE, Primary Examiner

U.S. Cl. X.R.

251—205